UNITED STATES PATENT OFFICE.

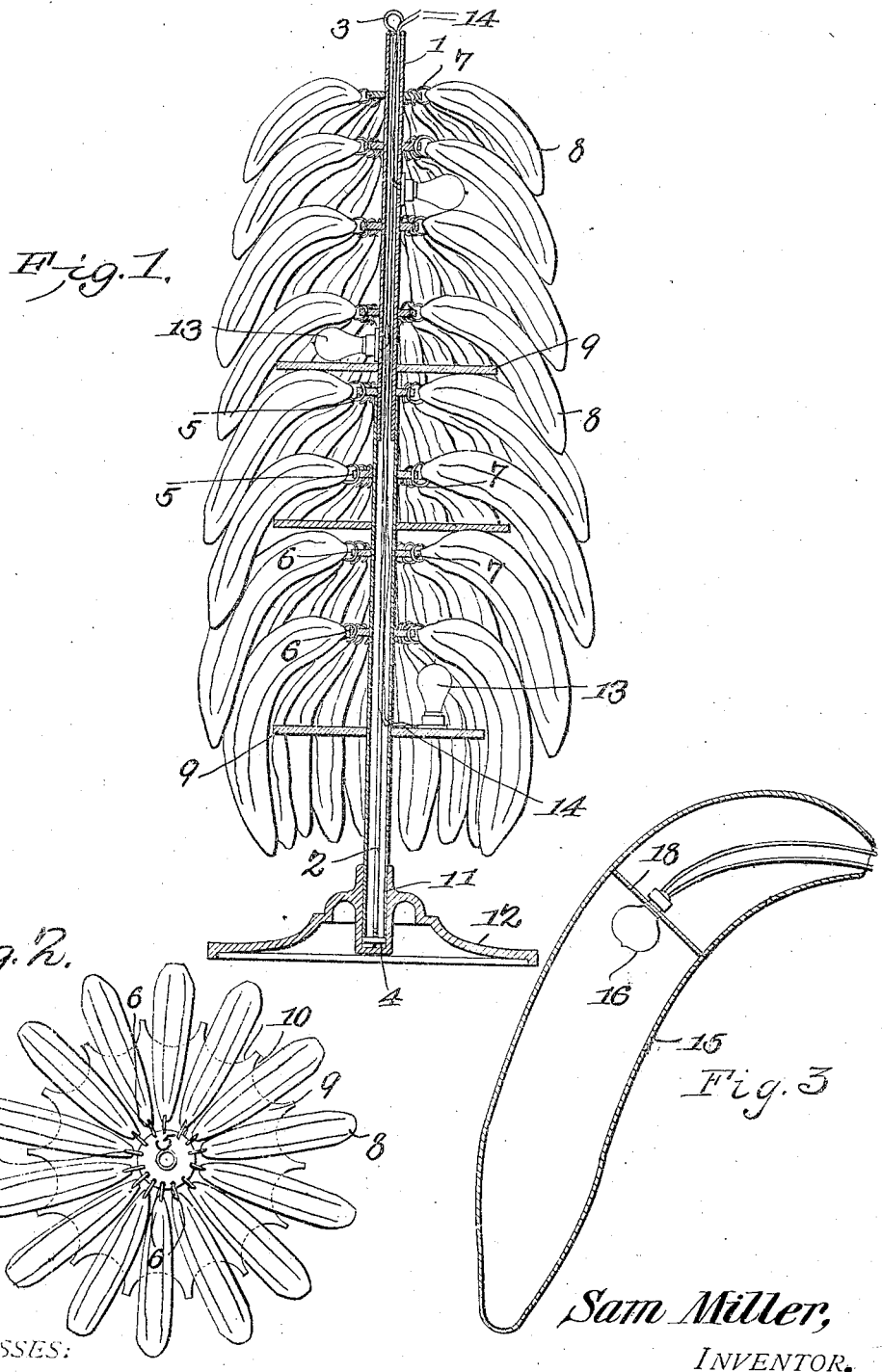

SAM MILLER, OF MARSHFIELD, WISCONSIN.

ARTIFICIAL FRUIT.

No. 874,415.  Specification of Letters Patent.  Patented Dec. 24, 1907.

Application filed May 15, 1906. Serial No. 317,037.

*To all whom it may concern:*

Be it known that I, SAM MILLER, a citizen of the United States, residing at Marshfield, in the county of Wood and State of Wisconsin, have invented a new and useful Artificial Fruit, of which the following is a specification.

This invention relates to a display device and its object is to provide an artificial bunch of fruit which may be used by fruit dealers and the like and which is provided with means for rendering it visible at night and capable for use as an illuminated display device.

A still further object is to provide simple means for connecting the artificial fruit to a central stem and for supporting said fruit in proper position.

Another object is to provide a device of this character made up of sections and which can be connected to form bunches in desired lengths.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a vertical section through a device constructed in accordance with this invention; Fig. 2 is a transverse section showing the lower tier of the bunch in plan; and Fig. 3 is an enlarged section through a modified form of artificial fruit.

Referring to the figures by characters of reference, 1 is a stem preferably made up of a plurality of sections each of which consists of a metal tube. The tubes are of different diameters so that the end of one can fit within the end of the adjoining section and the movement of these sections one into the other is limited in the manner hereinafter described. The complete stem made up of sections of this character is held together by a rod 2 which extends longitudinally through the tubes and has an eye 3 at its upper end while its lower end is screw threaded and engaged by a nut 4. By screwing this nut upon the rod the sections of the stem can be pressed firmly together so as to form a rigid device. The stem has a plurality of collars 5 thereon and each collar is formed with a plurality of openings 6. A wire 7 is threaded through the openings in each collar and also through corresponding openings in the upper ends of artificial fruit 8 which may be of any kind although preferably simulating bananas. This artificial fruit may be made of wood, paper or other material properly colored and the collars 5 will of course support them in tiers. At desired intervals supporting disks 9 are arranged upon the stem and the peripheries of the disks are recessed as shown at 10 to form seats for the adjacent artificialy fruit and hold them spread outward. These disks as well as the collars will be substantially concealed by the artificial fruit which is arranged so that the fruit of one tier will overhang the spaces between the fruit of the next lower tier.

The lower end of the stem 1 may be rotatably mounted in a socket 11 formed in a base 12 or if preferred said base may be dispensed with and the bunch suspended by placing the eye 3 in engagement with a suitable supporting object. Any other desired means may be employed for holding the bunch in an upright position. It will be understood that the size of the bunch can be increased or diminished as by adding or removing one or more stem sections and then binding them together by means of a rod 2 such as hereinbefore described. One of the collars 5 on each stem section rests upon the end of the adjoining stem section so as to limit the movement of each section into the adjoining section. It will be obvious that a bunch of artificial fruit constructed in this manner will closely simulate a bunch of natural fruit and can be used to advantage for display purposes in connection with the real fruit. In order that the bunch can also be utilized as an effective display device at night illuminating devices such as incandescent lamps 13 can be secured to the stem and one or more of the disks at points where they are concealed. These lamps may be connected to wires 14 extending through the stem although if preferred said wires may be arranged outside of said stem. By providing lamps such as herein described the entire bunch may be illuminated from the inside and the artificial fruit will therefore stand out from the bright background thus produced and become an effective display device.

Instead of arranging the lamps in the manner shown in Fig. 1 and instead of forming the artificial fruit of solid wood or paper each of these artificial fruit can be made of celluloid or other translucent material properly colored and hollow so as to receive a bulb. This construction has been disclosed in Fig. 3 wherein the artificial fruit 15 is shown provided with a bulb 16 therein the same being held spaced from the walls of the artificial fruit by a transparent collar 18 or in any other desired manner. By constructing the bunch entirely of artificial fruit of this character a very attractive effect will be produced at night when the same is illuminated.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the invention.

What is claimed is:

1. A display device comprising a stem consisting of tubular sections having engaging ends, means extending longitudinally through the sections for binding them together, a supporting disk upon each section and having a notched periphery, a collar upon each section and above the supporting disk, artificial fruit connected to each collar and bearing within the notches thereunder, said artificial fruit being disposed in contacting tiers, and illuminating devices upon the disks and concealed by the artificial fruit.

2. A display device comprising a sectional stem, means extending through the stem for holding the sections rigidly connected, a collar upon each section, artificial fruit disposed around the collar, securing means threaded through the collar and the fruit therearound for fixedly connecting said fruit to the collar, and a disk secured to each section and below the collar thereon, said disk having recesses in its periphery to receive the artificial fruit.

3. A display device comprising a stem consisting of tubular sections having engaging ends, means extending longitudinally through the sections for binding them together, a supporting disk upon each section and having a notched periphery, a collar upon each section above the supporting disk, artificial fruit connected to each collar and bearing within the notches thereunder, said artificial fruit being disposed in contacting tiers, and illuminating devices concealed by the artificial fruit.

In testimony that I claim the foregoing as my own, I have hereto affixed my signature in the presence of two witnesses.

SAM MILLER.

Witnesses:
C. S. VEDDER,
LYDIA EIPHOFF.